United States Patent [19]

Okada

[11] 3,769,813
[45] Nov. 6, 1973

[54] RESILIENT TORQUE BAR
[75] Inventor: Shiro Okada, Ashikaga, Japan
[73] Assignee: Fuji Jyukogyo Kabushiki Kaisha, Tokyo, Japan
[22] Filed: May 22, 1972
[21] Appl. No.: 255,362

[52] U.S. Cl. .................. 64/2 R, 64/1 V, 74/501
[51] Int. Cl. ............................................. F16c 1/06
[58] Field of Search ............... 64/2 R, 1 V, 1 S, 64/1 R, 2 P; 74/501

[56] References Cited
UNITED STATES PATENTS
3,043,120  7/1962  Waldron ................................. 64/2
3,234,723  2/1966  Brown .................................... 64/2
1,678,335  7/1928  Gaston .................................... 64/2
2,000,997  5/1935  Sharpe .................................... 64/2
3,395,551  8/1968  Morse ..................................... 64/3

Primary Examiner—Manuel A. Antonakas
Assistant Examiner—Randall Heald
Attorney—E. F. Wenderoth et al.

[57] ABSTRACT

A resilient torque bar of a construction such that, around a core axle of resilient substance, a plurality of layers of fiber cloth or metal wire net and a plurality of rubber layers are alternately wound in the left and right directions, or on the bias, and the whole combination is protected by an outer covering from any external damage.

5 Claims, 2 Drawing Figures

3,769,813

RESILIENT TORQUE BAR

BACKGROUND OF THE INVENTION

This invention relates to a resilient torque bar for transmitting torque in vehicles, and the like.

There have heretofore been used various types of universal joints or flexible axles for torque transmission between driving and driven axles intersecting at a certain angle. Of these, the universal joints are disadvantageous in that perfect alignment of the center of the two axles is difficult, on account of which there have generally been used two universal joints or self-aligning bearings. In this case, however, high precision parts are required, which inevitably results in large-sized structure of the power transmission mechanism to disadvantageously affect the space economy. Even the heretofore known flexible axles made of metal wire are not so flexible as expected, and, moreover, they are poor in their absorbability for vibrations in both axial and rotational directions thereof. In particular, they have many problems in regard to absorption of high frequency vibrations.

SUMMARY OF THE INVENTION

It is therefore an object of the present invention to solve the above-described disadvantages inherent in the conventional devices and to provide an improved torque bar having sufficient resiliency and capable of transmitting required torque with improved absorbability for vibrations. This improved torque transmission can be attained by constructing the part in a simplified configuration and making it to be flexibly deformed in accordance with displacement between the driving axle and the driven axle.

The foregoing object and other objects of the present invention will become more apparent from the following detailed description of the invention when read in conjunction with the accompanying drawing.

DETAILED DESCRIPTION OF THE INVENTION

Figure 1:
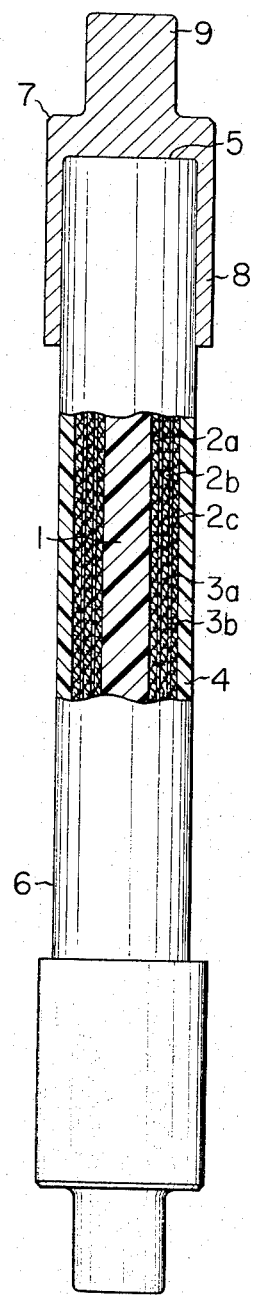
FIG. 1 is a side view, partly in longitudinal cross-section in the middle portion, of the resilient torque bar according to the present invention.
Figure 2:
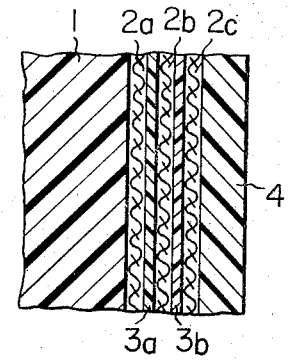
FIG. 2 is an enlarged longitudincal cross-section of the main part in FIG. 1.

Referring now to FIG. 1, the torque transmission bar of the present invention is constructed with a core axle 1, a plurality of fiber cloth layers or thin metal wire net layers 2a, 2b, 2c, etc. wound around the outer periphery of the core axle 1, a plurality of elastic layers 3a, 3b, etc., and an outer covering 4.

The core axle 1 possesses by itself an appropriate resiliency, and can be curved in arcuate form. It is made of an elastic, incompressible substance which does not produce substantial variation in radius against any external force. Such elastic materials are, for example, relatively hard synthetic rubber or synthetic resins in rod-shape having hardness of 70 to 80 measured in accordance with Japan Industrial Standard JIS-K-6301.

The outer periphery of the core axle 1 is covered with a layer of fiber cloth or thin metal wire net 2a tightly wound therearound in one direction (either left or right), or on the bias, on which a thin layer of elastic material 3a such as rubber is applied, thereafter the second layer 2b is wound around over the elastic layer 3a in the direction opposite that of the layer 2a or on the bias in the same way as in winding the first layer 2a, over which the elastic thin layer 3b is further applied. This operation is repeated for as many times as required, and finally the entire combination is covered with the outer covering 4. The number of winding of the fiber cloth or metal wire net and the elastic thin layers is selected appropriately in accordance with the predetermined amount of torque to be transmitted. Usually, and even number of windings is preferred with a view to securing uniform torsional rigidity, when the fiber cloth or metal wire net layer is wound alternately in both right and left directions.

For the method of coating the outer covering 4, there can be adopted any arbitrary method such as extrusion followed by vulcanization, or winding of raw rubber sheet followed by vulcanization, or others.

The outer covering 4 is used to protect the fiber cloth or metal wire net layer 2c from being damaged by any external force, or from corrosion due to water, oil, etc., and is made of an elastic substance such as rubber or synthetic resins.

The core axle 1, fiber cloth or metal wire net layers 2a, 2b, 2c, etc., the rubber layers 3a, 3b, etc., and the outer covering 4 can be made in a continuous length of product. The torque bar 6 as shown in FIG. 1 can be cut into a desired length from such continuous length of product.

At both ends 5 of the torque bar 6, there are provided cup-shaped connectors 7 having a cylindrical portion and a connecting portion 9. The cylindrical portion is tightly engaged with the end portion 5 of the core axle 1 so that required torque may be transmitted from the driving axle to the driven axle without any loss. The connecting portion 9 is used to connect the torque bar with both the driving axle and driven axle.

The operation of the torque bar according to the present invention will now be explained hereinbelow.

When a torque force is transmitted from the driving axle to the driven axle through the connector 7 engaged with the torque bar, the fiber cloth or metal wire net layers 2a, 2b, 2c, etc. wound around the core axle 1 alternately in the right and left directions, or on the bias, generally cause contraction in their radial direction with the consequent decrease in the torsional rigidity and strength. However, in the present invention as the core axle 1 is incompressible, this undesirable contraction is inhibited and the abovementioned disadvantage can be prevented beforehand. Also, in the torque transmission in the reverse direction, the layers 2a, 2b, 2c, etc. are wound around the core axle 1 alternately in the right and left directions, or on the bias, which also enables the torque force in both right and left directions to be transmitted to the driven axle with the same degree of rigidity.

If, at the time of torque transmission, the rotational direction of the torque bar is the same as that of the winding direction of the wire net layer 2a, the torque bar acts to tighten the wire net layers 2a and 2c which are in the same winding direction, and to loosen the wire net layer 2b which has its winding direction opposite to that of the layers 2a and 2c, whereby the layers 2b and 2c come close together. However, due to the rubber layer 3b interposed between the two wire net layers 2b and 2c, they are prevented from directly contacting each other so that the required torque can be transmitted without the wire net layers 2b and 2c rubbing against each other.

Also, the rubber layers 3a and 3b contribute to the flexibility or resiliency of the torque bar. When the torque is to be transmitted abruptly, the rubber layers 3a and 3b prevent the metal wire net layers 2a, 2b, and 2c from abruptly winding around the core axle 1, thereby relieving any undesirable shock to the axle while enabling the troque to be transmitted.

Further, as the core axle 1 and the outer covering 4 are made of elastic substances, and the rubber layers 3a, 3b, etc. are interposed between the layers 2a, 2b, 2c, etc., the torque bar can be flexibly deformed in accordance with any displacement between the driving axle and the driven axle.

As stated in the foregoing, the torque bar according to the present invention is useful not only for connection of the driving axle and the driven axle having eccentricity, but also for universal joints and flexible axles having larger intersecting angles than those of conventional ones. Furthermore, as the torque bar of the present invention flexibly deforms with respect to any displacement between the two axles, and possesses large vibration absorption effect in both axial and rotational directions, it is capable of transmitting the required torque force in both right and left rotational directions with uniform rigidity. From the standpoint of its structure, the torque bar according to the present invention is suited for continuous, industrialized mass-production, which facilitates manufacturing and reduction in the production cost thereof.

What I claim is:

1. A resilient torque bar comprising a core axle composed of a substantially incompressible elastic substance, a plurality of layers wound around said core axle alternately in the right and left directions, a plurality of rubber layers, each of said rubber layers being interposed between and directly contacting adjoining pairs of said plurality of said first mentioned layers, and an outer covering provided around the outermost layer for protecting said core axle and said surrounding layers from damage, whereby said plurality of rubber layers prevent said first mentioned layers from directly contacting and being rubbed against each other, impart flexibility and resiliency to the core axle, and relax abrupt shock which is imparted thereto at the time of torque transmission.

2. The resilient torque bar according to claim 6, in which said first mentioned plurality of layers are composed of fiber cloth.

3. The resilient torque bar according to claim 6, in which said first mentioned plurality of layers are composed of metal wire net.

4. The resilient torque bar according to claim 6, in which said first mentioned plurality of layers are wound around the core axle on the bias.

5. The resilient torque bar according to claim 6, in which the elastic substance constituting the core axle is selected from the group consisting of hard rubber and synthetic resins having hardness of 70 to 80 measured in accordance with JIS-K-6301.

* * * * *